US012508103B2

(12) United States Patent
Lee (10) Patent No.: US 12,508,103 B2
(45) Date of Patent: Dec. 30, 2025

(54) SYSTEM FOR DISPLAYING ORTHODONTIC INFORMATION OF ORAL CAVITY (71) Applicant: MEDIT CORP., Seoul (KR)

(72) Inventor: Donghoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 434 days.

(21) Appl. No.: 18/033,899

(22) PCT Filed: Oct. 26, 2021

(86) PCT No.: PCT/KR2021/015078
§ 371 (c)(1),
(2) Date: Nov. 6, 2023

(87) PCT Pub. No.: WO2022/092753
PCT Pub. Date: May 5, 2022

(65) Prior Publication Data
US 2024/0099811 A1   Mar. 28, 2024

(30) Foreign Application Priority Data

Oct. 28, 2020 (KR) .................. 10-2020-0141093
Nov. 17, 2020 (KR) .................. 10-2020-0153379

(51) Int. Cl.
*A61C 7/00* (2006.01)
*A61B 5/00* (2006.01)
(Continued)

(52) U.S. Cl.
CPC ............ *A61C 7/002* (2013.01); *A61B 5/7405* (2013.01); *A61B 5/742* (2013.01); *A61C 9/0053* (2013.01); *G16H 20/40* (2018.01)

(58) Field of Classification Search
CPC ..... A61C 7/002; A61C 9/0053; A61B 5/7405; A61B 5/742; A61B 5/4542; A61B 5/4547;
(Continued)

(56) References Cited

U.S. PATENT DOCUMENTS

| 7,698,068 | B2 * | 4/2010 | Babayoff | A61B 5/0088 702/19 |
| 8,768,016 | B2 * | 7/2014 | Pan | A61B 5/0088 382/128 |
| 10,198,819 | B2 * | 2/2019 | Kudriashov | G06T 11/001 |
| 10,828,130 | B2 * | 11/2020 | Pokotilov | A61C 7/08 |

(Continued)

FOREIGN PATENT DOCUMENTS

| JP | 2013-126578 A | 6/2013 |
| JP | 2013-128694 A | 7/2013 |

(Continued)

OTHER PUBLICATIONS

International Search Report for PCT/KR2021/015078 dated Jan. 28, 2022 (PCT/ISA/210).

*Primary Examiner* — Helen Shibru
(74) *Attorney, Agent, or Firm* — Sughrue Mion, PLLC (57) ABSTRACT

The present invention relates to a system for displaying orthodontic information of an oral cavity and, more specifically, to a system for displaying orthodontic information of an oral cavity, the system being capable of displaying changes in the positions of teeth to be corrected and also displaying a tooth extraction state, by using oral cavity scan data obtained by scanning the shape of a patient's oral cavity for orthodontic treatment. The system for displaying orthodontic information of an oral shape, according to the present invention, enables movements of teeth for the patient's orthodontic treatment to be easily displayed or enables teeth to be extracted to be easily displayed, and enables the shape of the oral cavity after orthodontic treatment and tooth extraction are finished, to be visually dis- (Continued)

played in an easy and quick manner, thereby facilitating the establishment of a plan for orthodontic treatment.

13 Claims, 10 Drawing Sheets

(51) Int. Cl.
*A61C 9/00* (2006.01)
*G16H 20/40* (2018.01)

(58) Field of Classification Search
CPC ........ A61B 18/20; G16H 20/40; G16H 30/40; G16H 50/50; G08B 3/10; G08B 5/22
USPC .............................................. 433/24; 348/66
See application file for complete search history.

(56) References Cited

U.S. PATENT DOCUMENTS

| | | | |
|---|---|---|---|
| 11,766,312 B1* | 9/2023 | Raslambekov | A61C 9/0046 433/24 |
| 2004/0073417 A1 | 4/2004 | Rubbert et al. | |
| 2013/0325431 A1 | 12/2013 | See et al. | |
| 2020/0187881 A1* | 6/2020 | Lim | A61B 5/0077 |
| 2024/0099813 A1* | 3/2024 | Lee | A61C 7/002 |
| 2024/0173078 A1* | 5/2024 | Kim | G16H 50/50 |

FOREIGN PATENT DOCUMENTS

| | | |
|---|---|---|
| JP | 5959539 B2 | 8/2016 |
| KR | 10-2015-0039028 A | 4/2015 |
| KR | 10-1829409 B1 | 2/2018 |
| WO | 2008/149221 A1 | 12/2008 |
| WO | 2018/175486 A1 | 9/2018 |

* cited by examiner

SYSTEM FOR DISPLAYING ORTHODONTIC INFORMATION OF ORAL CAVITY

CROSS REFERENCE TO RELATED APPLICATIONS

This application is a National Stage of International Application No. PCT/KR2021/015078 filed Oct. 26, 2021, claiming priorities based on Korean Patent Application No. 10-2020-0141093 filed Oct. 28, 2020 and Korean Patent Application No. 10-2020-0153379 filed Nov. 17, 2020, the entire disclosures of which are incorporated herein by reference.

TECHNICAL FIELD

The present disclosure relates to an oral orthodontic information display system and, more specifically, to an oral orthodontic information display system that may display a change in a position of tooth to be corrected and to display the state of tooth extraction by using oral scan data obtained by scanning an oral shape of a patient for orthodontic treatment.

BACKGROUND

During orthodontic treatment, it is important to clearly identify a patient's oral structure and to determine which teeth are to be moved in what direction and to what extent for the purpose of orthodontics. In addition, it is frequently necessary to extract teeth such that the treatment effect is enhanced as the orthodontic treatment proceeds.

When planning orthodontic treatment and extracting teeth when necessary, it would be convenient for each of the practitioner and the patient to be able to identify in advance the oral shape after orthodontics and the oral shape after extraction resulting from movements of individual teeth.

Recently, a system has been used in some cases such that oral scan data acquired by using a three-dimensional scanner is used to automatically distinguish teeth and to automatically identify and assign tooth numbers.

Therefore, if such oral scan data could be used to plan orthodontic treatment or to explain the procedure and plan of orthodontic treatment to the patient, it would be convenient for the practitioner and the patient in many aspects because a change in the oral shape can be identified intuitively.

Therefore, there is a need for a system capable of visually displaying in advance and identifying a change in oral shape after moving teeth for correction and a change in oral shape after tooth extraction, from oral scan data.

SUMMARY

The present disclosure has been made to solve the above-mentioned necessities, and it is an aspect of the present disclosure to provide an oral orthodontic information display system that can visually display a change in tooth position for correction and a change in oral shape after tooth extraction in an easy manner by using an oral shape acquired from oral scan data.

In accordance an aspect of the present disclosure, an oral orthodontic information display system may include: an oral information storage module configured to store oral information including oral scan data obtained by scanning an oral shape and tooth area data which divides areas of individual teeth in the oral scan data; a correction range module configured to set and store a correctable area which is a range in which positions of individual teeth can be adjusted by correction and a tooth extraction area on an outer periphery of the correctable area by using the oral information stored in the oral information storage module; an oral display module configured to display the oral shape on a display device by using the oral information stored in the oral information storage module; an orthodontic information receiving module configured to receive, from an input device, orthodontic information that selects at least one from the teeth of the oral information displayed on the display device and changes a position of the selected tooth; and an oral information change module configured such that, if the orthodontic information received by the orthodontic information receiving module is included in the range of the correctable area, the oral information stored in the oral information storage module is changed with the orthodontic information, the result of change is displayed on the display device by the oral display module, and if the orthodontic information received by the orthodontic information receiving module is included in the range of the tooth extraction area, the oral information stored in the oral information storage module is changed by setting the corresponding tooth as an extraction target tooth, and the oral shape in which the extraction target tooth has been extracted is displayed on the display device by the oral display module.

An oral orthodontic information display system of the present disclosure is advantageous in that movements of teeth for patient's teeth correction can be easily displayed, or teeth to be extracted can be easily displayed, and the oral shape after correction and extraction can be visually displayed in an easy and fast manner, thereby facilitating establishment of an orthodontic treatment plan.

DETAILED DESCRIPTION

Hereinafter, an oral orthodontic information display system according to an embodiment of the present disclosure will be described with reference to the accompanying drawings.

Figure 1:
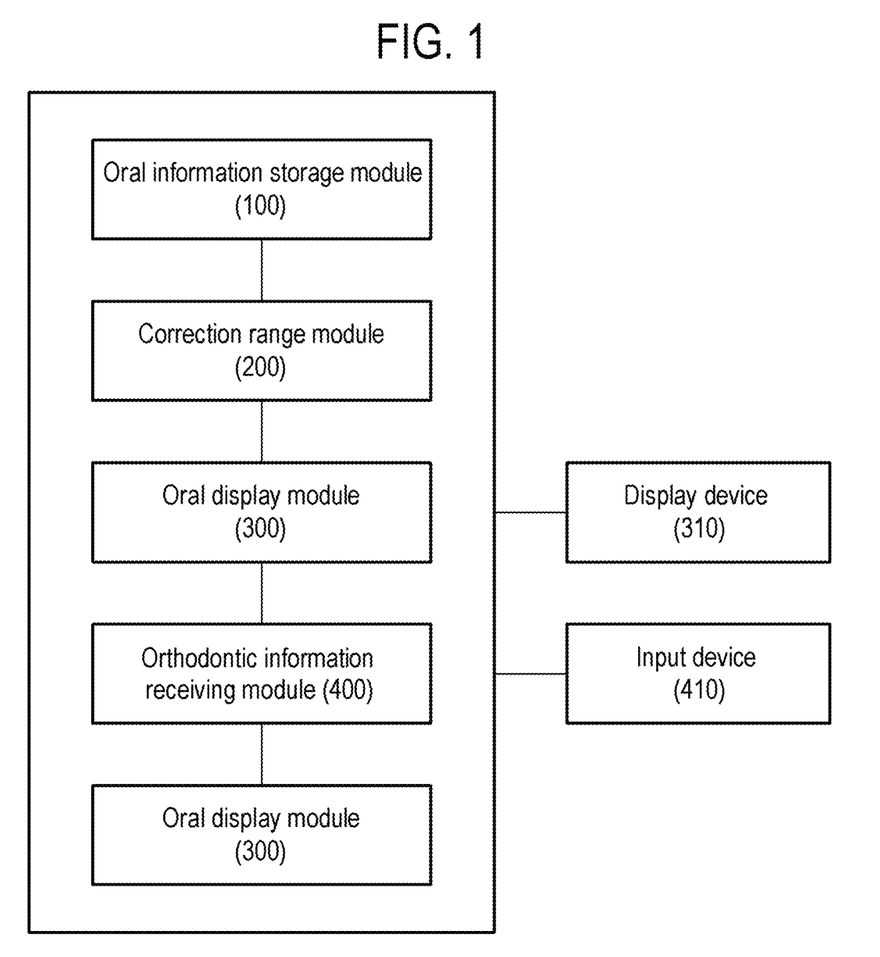
FIG. 1 is a block diagram of an oral orthodontic information display system according to an embodiment of the present disclosure.

FIG. 1 is a block diagram of an oral orthodontic information display system according to an embodiment of the present disclosure.

The oral orthodontic information display system of the present disclosure is configured such that, on the basis of the structure and shape of teeth of a patient obtained by scanning the patient's oral structure, the oral structure after the patient's dental correction process or orthodontic treatment is visually identified, and if teeth are extracted in the correction process, the oral structure after the extraction is visually identified.

Referring to FIG. 1, the oral orthodontic information display system of the present embodiment includes an oral information storage module 100, a correction range module 200, an oral display module 300, an orthodontic information receiving module 400, and an oral information change module 500.

Oral information is stored in the oral information storage module 100. The oral information includes oral scan data and tooth area data. The oral information may also include tooth numbers of individual teeth and tooth numbers of missing teeth, as additional information.

In the present embodiment, oral scan data obtained by scanning the patient's oral structure three-dimensionally is received and stored in the oral information storage module 100. By analyzing such oral scan data, areas corresponding to teeth, among the shape of the oral cavity, can be identified. In addition, parts corresponding to tooth areas may again be divided into shape information on individual teeth, and tooth numbers may be assigned to such individual teeth.

Such process of separating tooth areas from the oral scan data and process of automatically assigning tooth numbers to individual teeth may be performed in a separate device, and may be stored as organized oral information in the oral information storage module 100. Alternatively, the oral orthodontic information display system of the present disclosure may receive oral scan data, extract oral information therefrom, and store the same in the oral information storage module 100.

The correction range module 200 uses the oral information stored in the oral information storage module 100 so as to set and store a correctable area 11 which refers to a range in which the position of each tooth can be adjusted through correction.

Various methods may be used by the correction range module 200 to set the correctable area 11. For example, the correction range module 200 may set the correctable area 11 with reference to the dimension of a tooth movement range that has been set in advance. That is, the correction range module 200 may set the correctable area 11 such that the range in which each tooth can be moved by correction corresponds to a distance of movement by correction within a specific dimension of a distance of 5 mm. In some cases, the correction range module 200 may set the correctable area 11 to have a different size for each tooth according to each tooth type (molars or premolars).

In addition to the method in which the correctable area 11 is set with reference to a distance of movement through specific correction, the correction range module 200 may also set the correctable area 11 by using the state of arrangement of teeth included in oral information. With reference to a path of arrangement of teeth in the patient's oral shape, the contour of the path of arrangement may be set, and the dimension of a range in which teeth can be moved by correction within a predetermined distance range from the contour may be set by the correction range module 200 as the correctable area 11.

In addition to the above-mentioned method, the range in which teeth can be moved orthodontically may be set by various methods in view of the positional relation with adjacent peripheral teeth and the structure of gums, dental roots, and the like, and the range that has been set may be set by the correction range module 200 as the correctable range.

The correction range module 200 sets and stores a tooth extraction area 13 on the outer periphery of the correctable area 11. The tooth extraction area 13 surrounding the outside of the correctable area 11 is set in a similar method as the method in which the correction range module 200 sets the correctable area 11. If teeth to be corrected deviate from the correctable area 11 and are positioned in the tooth extraction area 13, the corresponding teeth become extraction target teeth that are to be extracted in an orthodontic treatment process. That is, if teeth are moved out of the range in which tooth positions can be adjusted by an orthodontic treatment, the correction range module 200 sets the tooth extraction area 13 in order to recognize the teeth as teeth to be extracted.

Figure 2:
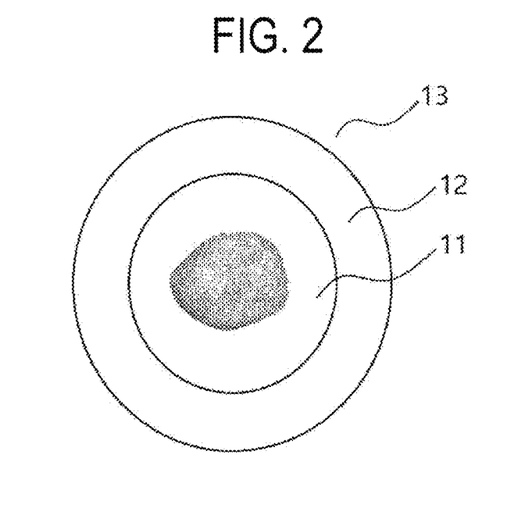
FIG. 2 schematically illustrates a case in which a tooth correction range is set by the oral orthodontic information display system in FIG. 1.

In the present embodiment, the correction range module 200 sets a correction limit area 12 between the correctable area 11 and the tooth extraction area 13. The correction limit area 12 corresponds to an intermediate zone between the correctable area 11 and the tooth extraction area 13. The correctable area 11, the correction limit area 12, and the tooth extraction area 13 have a schematic form illustrated in FIG. 2. The correction range module 200 may set the correctable area 11, the correction limit area 12, and the tooth extraction area 13 with reference to distances related to scanned teeth as illustrated in FIG. 2, and may set ranges regarding respective areas in various methods other than the above-described ones.

The oral display module 300 displays an oral shape on the display device 310 by using the oral information stored in the oral information storage module 100. If the user adjusts the position of a tooth by using an input device 410 such as a mouse, the oral display module 300 also displays the shape of the tooth that moves according to a correction command on the device 310. The display device 310 may be a general computer display device 310 such as an LCD monitor, and various types of other display devices 310 (for example, a touchscreen) may be used.

The orthodontic information receiving module 400 receives, through the input device 410, orthodontic information resulting from selecting at least one tooth from the oral information displayed on the display device 310 and changing (correcting) the position thereof. Various computer system tools such as a mouse, a touchpad, a touchscreen, a keyboard, and a trackpad may be used as the input device 410 through which orthodontic information is input.

Figure 3:
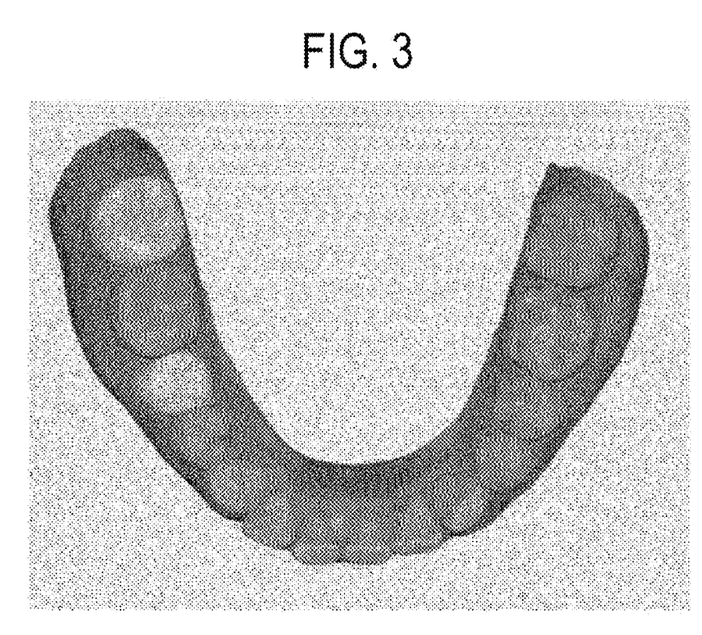
FIG. 3 to FIG. 10 illustrate screens displayed on a display device in order to describe operations of the oral orthodontic information display system in FIG. 1.

In the present embodiment, if the user clicks and selects one tooth by using a mouse as the input device 410, the corresponding tooth is displayed with a different color from the previous one as in FIG. 3. The user transfers orthodontic information to the orthodontic information receiving module 400 by clicking and dragging the mouse as in FIG. 4. The user may establish an orthodontic plan or identify the oral shape to be corrected while identifying the oral and dental shapes displayed on the display device 310 by the oral display module 300.

Figure 5:
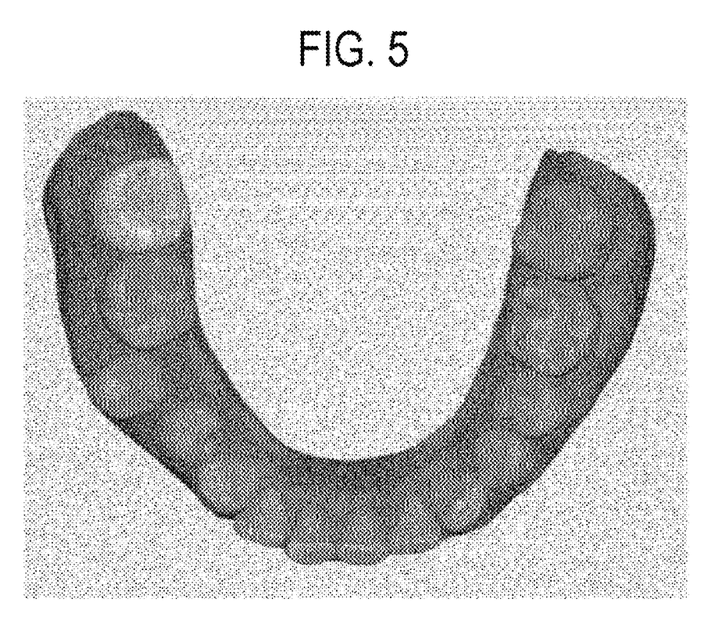

The oral information change module 500 uses the orthodontic information received by the orthodontic information receiving module 400 such that the oral information stored in the oral information storage module 100 is changed to a corrected oral state, and such that the oral display module 300 displays the changed oral shape on the display device 310 as in FIG. 5.

The oral information change module 500 changes oral information differently according to the area to which the tooth correction position based on orthodontic information belongs, among the correctable area 11, the correction limit area 12, and the tooth extraction area 13, and then displays the same on the display device 310.

If orthodontic information received by the orthodontic information receiving module 400 belongs to the correctable area 11, the oral information change module 500 changes the oral information to the tooth position received by the orthodontic information receiving module 400, and operates the oral display module 300 such that a corrected tooth is displayed in the changed position as in FIG. 5.

Figure 8:
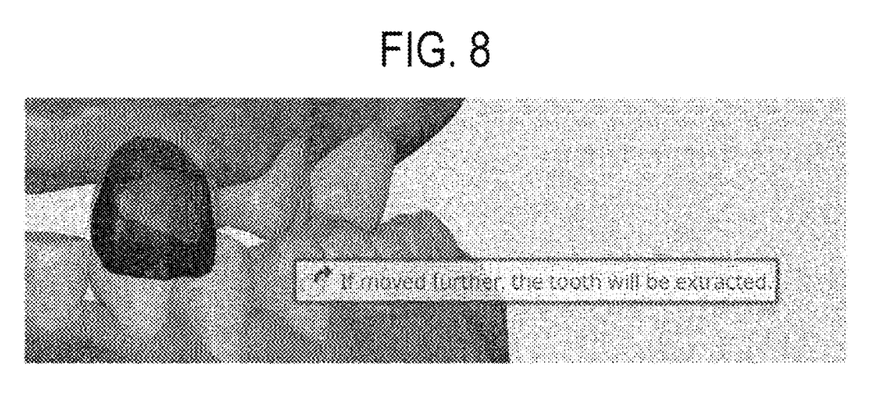
Figure 9:
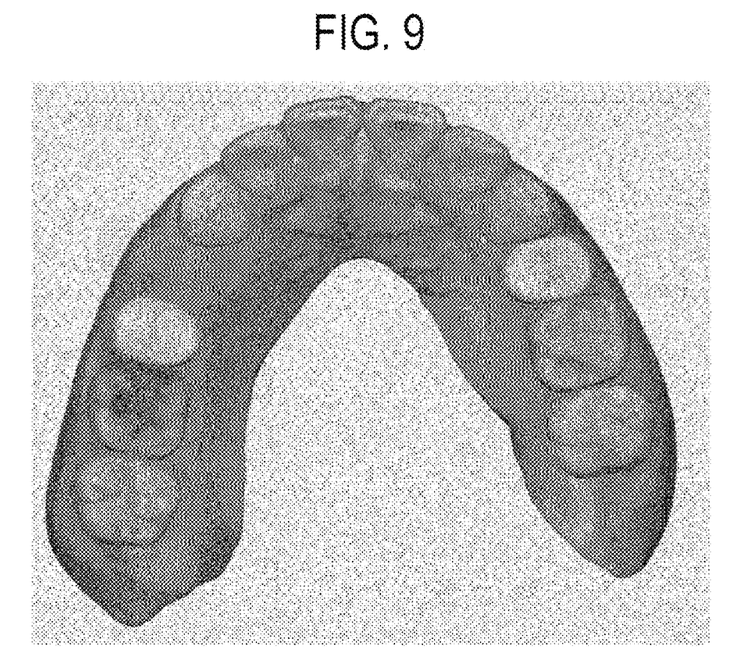
Figure 10:
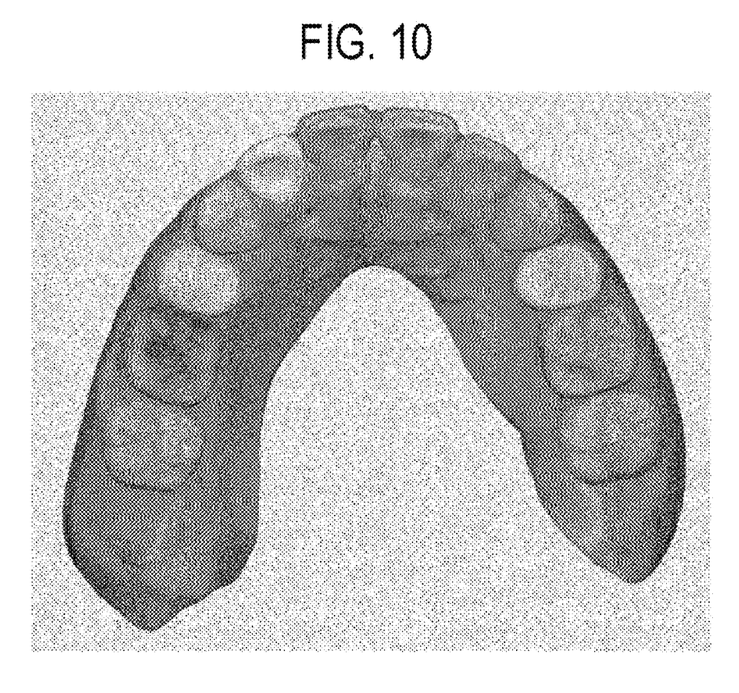

If orthodontic information received by the orthodontic information receiving module 400 belongs to the range of the tooth extraction area 13 as in FIG. 8 or FIG. 9, the oral information change module 500 determines that the corresponding tooth belonging to the tooth extraction area 13 is an extraction target tooth, changes the oral information, and operates the oral display module 300 such that the oral shape is displayed on the display device 310 as in FIG. 10 with the extraction target tooth removed therefrom. In the present embodiment, if one tooth is extracted, the oral information change module 500 successively moves teeth behind the extracted tooth to the position of the extracted tooth as illustrated in FIG. 10, thereby changing the oral information, and displays the changed oral information by means of the oral display module 300. In some cases, instead of the above-mentioned method, the oral information may be changed such that only the extracted tooth is changed to the removed state, while the remaining teeth maintain the positions, and the changed oral information may be displayed on the oral display module 300.

If orthodontic information received by the orthodontic information receiving module 400 belongs to the range of the correction limit area 12, the oral information change module 500 changes the orthodontic information to orthodontic information of a position belonging to the correctable area 11 in the closest position, changes the oral information to a value identical thereto, and operates the oral display module 300 such that the corrected tooth is displayed in the changed position. More specifically, no tooth is moved to any area exceeding the limit line of the correctable area 11. The correction limit area 12 is advantageous in that the user can easily recognize the boundary of the correctable area 11. If the user moves the correction target tooth to the correction limit area 12, the position of the correction target tooth is automatically modified to the closest correctable area 11. Therefore, the user may move the correction target tooth to the correctable maximum movement position (to the limit line of the correctable area 11) by using the correction limit area 12. If there is no correction limit area with only a distinction between a correctable area and a tooth extraction area, a tooth may be recognized as an extraction target tooth contrary to the user's intent, thereby inconveniencing the user. Therefore, if the user keeps moving a tooth to the largest extent within the correctable range and inadvertently moves the correction target tooth to the tooth extraction area, a situation where the the corresponding tooth is deemed as a tooth to be extracted may occur. However, the correction limit area 12 may be used as in the present embodiment such that the user can intuitively recognize deviation from the correctable area 11, thereby preventing inadvertent designation of an extraction target tooth. There is another advantage in that the occurrence of a medical accident, which would otherwise occur if a tooth that is not a subject of extraction is inadvertently extracted, could be prevented.

Hereinafter, operations of the oral orthodontic information display system configured as described above will be described.

Firstly, by using oral information stored in the oral information storage module 100, the oral display module 300 displays the shape of an oral cavity on the screen of the display device 310.

The oral display module 300 displays the shape of an oral cavity to be corrected, as illustrated in FIG. 3, on the display device 310. In some cases, tooth numbers may be additionally displayed on individual teeth, and other pieces of oral information may be additionally displayed.

The correction range module 200 uses the oral information stored in the oral information storage module 100 so as to set and store a correctable area 11, a correction limit area 12, and a tooth extraction area 13 for each tooth.

If the user manipulates the mouse (input device 410) so as to place the mouse cursor on the correction target tooth and then clicks the same, the oral display module 300 displays the correction target tooth with a color different from those of other teeth as illustrated in FIG. 3.

Figure 4:
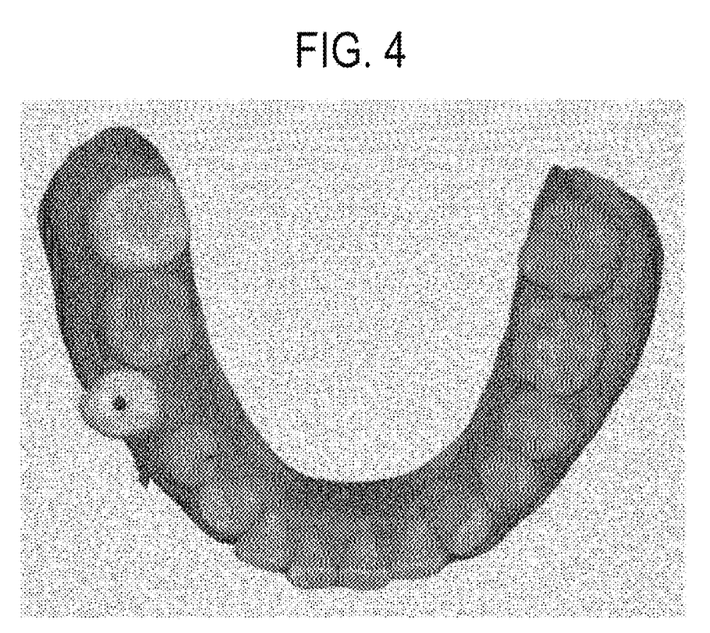

If the user drags the correction target tooth while clicking the mouse, the oral information change module 500 and the oral display module 300 reflect the orthodontic information received by the orthodontic information receiving module 400 in real time such that the oral display module 300 displays the oral shape on the display device 310. Furthermore, if the user clicks and drags the mouse, movements of the selected tooth along the mouse cursor are displayed on the display device 310 as illustrated in FIG. 4.

If the user selects a tooth and moves the same to a desired position as illustrated in FIG. 5, the oral information change module 500 changes orthodontic information of the corresponding tooth to the moved position, and displays the same on the display device 310 by means of the oral display module 300. FIG. 5 illustrates a case in which the tooth correction position belongs to the correctable area 11. If the oral information change module 500 recognizes that the user has moved the tooth within the range of the correctable area 11 that the correction range module 200 has set as a correctable range, the orthodontic information is changed to the last position of movement made by the user as illustrated in FIG. 5, and the changed result is displayed on the display device 310.

At this time, the oral display module 300 may display any one of elements of the tooth, such as color, brightness, and saturation, differently according to the correction distance such that the user can recognize the degree of change in position of the correction target tooth from the tooth position before correction in real time.

Figure 6:
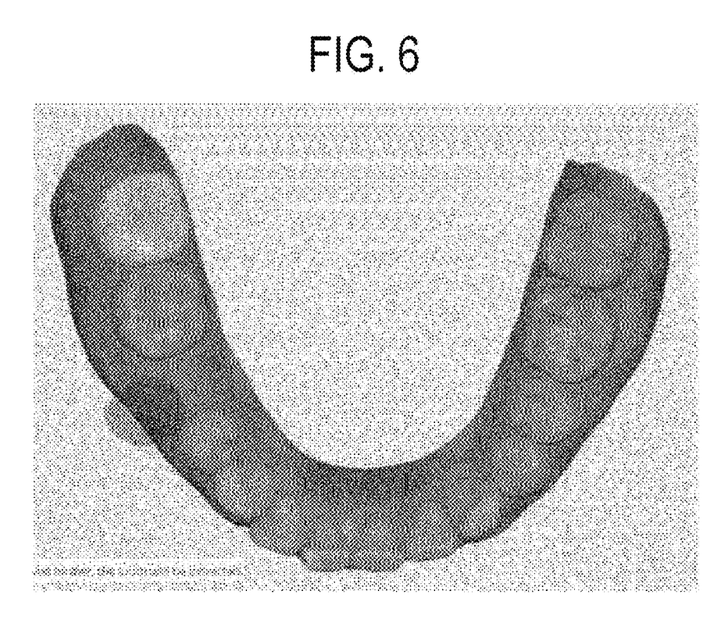

For example, as illustrated in FIG. 6, as the orthodontic information received by the orthodontic information receiving module 400 becomes distant from the tooth position before correction, the oral display module 300 may display a dimmer color tone on the display device 310. While dragging and moving the tooth with the mouse, the user may intuitively recognize the tooth correction distance with reference to the degree to which the color tone of the tooth becomes dimmer. In addition, the user may indirectly identify to which area the position of the moved tooth belongs among the correctable area 11, the correction limit area 12, and the tooth extraction area 13 with reference to the degree to which the tooth is displayed dim. In some cases, the oral display module 300 may be operated such that there is no difference in displaying the correction target tooth in the correctable area 11 and the correction limit area 12, and the color of the correction target tooth is changed only if the tooth enters the tooth extraction area 13 or the color tone of the changed color changes according to the distance.

Separately therefrom, the oral display module 300 may display, on the display device 310, whether the position of the tooth moved by the user deviates from the correctable area 11 or deviates from the correction limit area 12 and enters the tooth extraction area 13.

Figure 7:
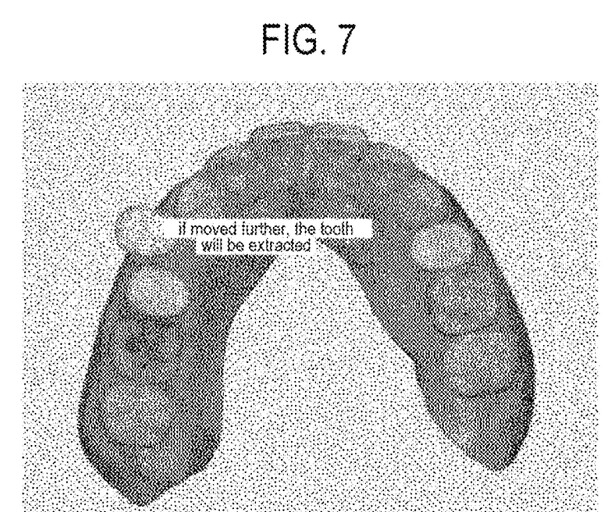

For example, as illustrated in FIG. 7, if the position of the tooth dragged by the mouse enters the correction limit area 12, the oral display module 300 may visually display a message such as "if moved further, the tooth will be extracted" on the display device 310, and may display the tooth color at it is with no change. In some cases, a message such as "cannot move further this point" may be displayed on the display device 310. Such a state may also be displayed by various other visual methods, such as blinking the entire screen.

In addition, if the position of the tooth dragged by the mouse enters the tooth extraction area 13, the oral display module 300 may visually display a message such as "if moved further, the tooth will be extracted" on the display device 310 as illustrated in FIG. 8, and the tooth may also be displayed in a different color such as red. FIG. 8 illustrates an example of the screen displayed on the display device 310 when the position of the dragged tooth enters the tooth extraction area 13. The display device 310 may display the color tone of the tooth to be dimmer, as illustrated in FIG. 9, as the tooth that has entered the tooth extraction area 13 is moved away from the existing position.

Meanwhile, if a movement of the tooth dragged by the mouse to the tooth extraction area 13 is detected, the oral information change module 500 sets the corresponding tooth as the extraction target tooth, changes oral information accordingly, and displays the shape of the oral cavity, from which the extraction target tooth is removed, on the display device 310 through the oral display module 300 as illustrated in FIG. 10.

As such, the oral orthodontic information display system of the present disclosure is advantageous in that not only the dental correction state, but also designation of the extraction target and shape of the oral cavity after extraction can be effectively displayed and identified. Cases in which teeth need to be extracted for more effective dental correction in an orthodontic treatment process occur frequently. The present disclosure is advantageous in that movements of teeth to target positions and designation of teeth to be extracted can be easily performed by using a single integrated interface. An input device (for example, a mouse) is used to perform such operations by dragging the cursor such that the user can handle what is necessary to establish an orthodontic plan, and can easily identify the result in a visual manner, thereby providing the user with convenience. In addition, the present disclosure can be very effectively used to establish an orthodontic plan if not only the dental orthodontics state, but also the shape of the oral cavity after extraction and the oral correction state can be visually displayed and identified. In addition, when consulting about a patient's orthodontic treatment at a dental office, the oral orthodontic information display system of the present disclosure may be used after scanning the patient's oral shape such that both the dentist and the patient can visually identify the oral state, the orthodontic plan, and the oral state after correction during the consultation. In this case, the patient's satisfaction may be improved because the corrected oral shape and the teeth to be extracted can be identified intuitively. In addition, the practitioner also has an advantage in that the orthodontic plan can be more effectively explained to the user, and future orthodontic treatment can be established more conveniently.

Although the present disclosure has been described above with reference to preferred examples, the scope of the present disclosure is not limited to the embodiments illustrated and described above.

For example, it has been assumed in the above descriptions that the area in which a tooth can be dragged and moved with a mouse is divided into a correctable area 11, a correction limit area 12, and a tooth extraction area 13, but the area may be divided only into a correctable area 11 and a tooth extraction area 13, with the correction limit area 12 omitted. In this case, the correction range module 200 sets and stores the correctable area 11 and the tooth extraction area 13 for each tooth by using oral information. The oral information change module 500 identifies which area a corrected tooth belongs, among the correctable area 11 and the tooth extraction area 13, according to a position thereof. If the corrected tooth position belongs to the correctable area 11, the oral information change module 500 changes oral information to the corresponding position, and if the corrected tooth position belongs to the tooth extraction area 13, the oral information change module 500 sets the corresponding tooth as the extraction target, changes oral information, and displays the same on the display device 310.

In addition, although it has been assumed in the above descriptions that a tooth selected while the orthodontic information receiving module 400 receives orthodontic information is displayed by the oral display module 300 with a different color from those of other teeth, the oral display module may not display such a visual change.

In addition, although it has been assumed in the above descriptions that the oral display module displays the color tone of the corresponding tooth to be dimmer as the tooth correction distance increases, such a change may not be displayed, and the oral display module may display the change by visual display methods other than the color tone change on the display device. In some cases, the oral display module may use a display device such as a speaker such that a change in correction distance is audibly indicated. Not only the tooth correction distance, but also deviation of the tooth correction position from the correctable area or from the correction limit area may be identified, and the oral display module may use a speaker such that a change in position of the correction target tooth is audibly indicated. The oral display module may also employ both the visual method and the auditory method.

In addition, although it has been assumed in the above descriptions that, if orthodontic information received by the orthodontic information receiving module 400 belongs to the range of the correction limit area 12, the oral information change module 500 changes the orthodontic information to orthodontic information in a position belonging to a correctable area 11 in the closest position, the criteria for changing the position of a tooth positioned in the correction limit area 12 to the correctable area 11 by the oral information change module 500 may be changed by using various other methods. For example, the center of a tooth and a position in the correction limit area 12 may be connected by a straight line, and the oral information change module 500 may change the orthodontic information to a position of intersection between the straight line and the outer contour line of the correctable area 11.

What is claimed is:

1. An orthodontic information display apparatus comprising:
   an oral information storage configured to store oral information comprising oral scan data obtained by scanning an oral shape and tooth area data which divides areas of individual teeth in the oral scan data;
   a correction range setter configured to set and store a correctable area which is a range in which positions of the individual teeth are to be adjusted by correction and a tooth extraction area on an outer periphery of the correctable area by using the oral information stored in the oral information storage;

an oral displayer configured to display the oral shape on a display device by using the oral information stored in the oral information storage;

an orthodontic information receiver configured to receive, from an input device, orthodontic information that selects at least one from the teeth of the oral information displayed on the display device and changes a position of the selected tooth; and an oral information changer configured such that:

if the changed position of the selected tooth is included in a range of the correctable area, the oral information stored in the oral information storage is changed with the orthodontic information and the oral shape in which the position of the selected tooth has been changed according to the received orthodontic information is displayed on the display device by the oral displayer; and if the changed position of the selected tooth is included in a range of the tooth extraction area, the oral information stored in the oral information storage is changed by setting the selected tooth as an extraction target tooth and the oral shape in which the extraction target tooth has been extracted is displayed on the display device by the oral displayer.

2. The orthodontic information display apparatus of claim 1, wherein the correction range setter is configured to set and store a correction limit area between the correctable area and the tooth extraction area, and wherein the oral information changer module is configured such that, if the changed position of the selected tooth is included in a range of the correction limit area, the orthodontic information is changed so that the changed position of the selected tooth is included in the range of the correctable area, the oral information stored in the oral information storage is changed with the changed orthodontic information, and the oral shape according to the changed oral information is displayed on the display device by the oral displayer.

3. The orthodontic information display apparatus of claim 1, wherein the oral information changer and the oral displayer are configured to reflect the orthodontic information received by the orthodontic information receiver in real time such that the orthodontic information is identified, and the oral shape is displayed on the display device by the oral displayer.

4. The orthodontic information display apparatus of claim 3, wherein the orthodontic information receiver is configured to receive the orthodontic information as an input of selecting and dragging at least one of teeth of the oral information displayed on the display device, and wherein the oral displayer is configured to display, on the display device, a color tone of the selected tooth differently from other teeth while the orthodontic information receiver receives the orthodontic information.

5. The orthodontic information display apparatus of claim 3, wherein the oral displayer is configured to display, on the display device, a color tone of the selected tooth to be gradually dimmer in at least a partial area as the changed position of the selected tooth moves away from a previous position of the selected tooth.

6. The orthodontic information display apparatus of claim 3, wherein the orthodontic information receiver is configured to receive the orthodontic information as an input of selecting and dragging at least one from teeth of the oral information displayed on the display device by the input, receive the orthodontic information only if the changed position of the selected tooth is within the range of the correctable area, and limit reception of the orthodontic information if the changed position of the selected tooth is out of the correctable area.

7. The orthodontic information display apparatus of claim 3, wherein the orthodontic information receiver is configured to receive the orthodontic information as an input of selecting and dragging at least one from teeth of the oral information displayed on the display device, and wherein the oral displayer is configured such that, if the changed position of the selected tooth deviates from the correctable area, the orthodontic information is displayed by one of a visual method and an auditory method.

8. The orthodontic information display apparatus of claim 2, wherein the oral information changer and the oral displayerd are configured to reflect the orthodontic information received by the orthodontic information receiver in real time such that the orthodontic information is identified, and the oral shape is displayed on the display device, and wherein the oral displayer is configured to:

if the changed position of the selected tooth deviates from the correctable area, display, on the display device, that the changed position of the selected tooth deviates from the correctable area by one of a visual method and an auditory method; and if the changed position of the selected tooth deviates from the correction limit area, display, on the display device, that the changed position of the selected tooth exists in the range of the tooth extraction area by one of the visual method and the auditory method.

9. The orthodontic information display apparatus of claim 1, wherein the oral displayer is configured such that:

if the changed position of the selected tooth is in the range of the correctable area, the selected tooth with a first color is displayed on the display device, and if the changed position of the selected tooth is in the range of the tooth extraction area, the selected tooth with a second color which is different from the first color is displayed on the display device.

10. The orthodontic information display apparatus of claim 2, wherein the oral displayer is configured to:

if the changed position of the selected tooth is in the range of the correctable area, display the selected tooth with a first color on the display device;

if the changed position of the selected tooth is in the range of the correction limit area, display the selected tooth with the first color on the display device; and if changed position of the selected tooth is in the range of the tooth extraction area, display the selected tooth with a second color which is different from the first color on the display device.

11. The orthodontic information display apparatus of claim 1, wherein the correction range setter is configured to set the correctable area and the tooth extraction area based on a preset tooth movement range.

12. The orthodontic information display apparatus of claim 1, wherein the correction range setter is configured to set the correctable area and the tooth extraction area to have different sizes for the individual teeth by using the oral information stored in the oral information storage.

13. The orthodontic information display apparatus of claim 1, wherein the correction range setter is configured to set the correctable area and the tooth extraction area based on a tooth movement range, and wherein the tooth movement range is determined based on a path of arrangement of teeth by using the oral information stored in the oral information storage.

* * * * *